(12) United States Patent
Odaka

(10) Patent No.: US 11,143,214 B2
(45) Date of Patent: Oct. 12, 2021

(54) ROD ASSEMBLY AND FLUID PRESSURE DEVICE

(71) Applicant: SMC CORPORATION, Chiyoda-ku (JP)

(72) Inventor: Tsukasa Odaka, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/466,549

(22) PCT Filed: Nov. 13, 2017

(86) PCT No.: PCT/JP2017/040680
§ 371 (c)(1),
(2) Date: Jun. 4, 2019

(87) PCT Pub. No.: WO2018/105315
PCT Pub. Date: Jun. 14, 2018

(65) Prior Publication Data
US 2020/0072254 A1    Mar. 5, 2020

(30) Foreign Application Priority Data

Dec. 6, 2016    (JP) .............................. JP2016-236470

(51) Int. Cl.
*F15B 15/14*    (2006.01)
*F15B 15/22*    (2006.01)
(Continued)

(52) U.S. Cl.
CPC ........ *F15B 15/1447* (2013.01); *F15B 15/226* (2013.01); *F16J 15/3268* (2013.01); *F15B 15/2861* (2013.01)

(58) Field of Classification Search
CPC .............. F15B 15/1447; F15B 15/1452; F15B 15/1457; F15B 15/226; F15B 15/1461; F15B 15/2861; F16J 1/008; F04B 53/145
(Continued)

(56) References Cited

U.S. PATENT DOCUMENTS 2,493,602 A * 1/1950 Sterrett ................... F01B 17/00
91/396
2,981,232 A * 4/1961 Peras ...................... F15B 15/17
91/416
(Continued)

FOREIGN PATENT DOCUMENTS

CN          1884853 A       12/2006
CN         102518618 A       6/2012
(Continued)

OTHER PUBLICATIONS

DE 2730112 A1 machine translation to English from espacenet. (Year: 1979).*
(Continued)

*Primary Examiner* — Thomas E Lazo
*Assistant Examiner* — Michael Quandt
(74) *Attorney, Agent, or Firm* — Oblon, McClelland, Maier & Neustadt, L.L.P.

(57) ABSTRACT

A rod assembly for a fluid pressure cylinder has a rod member and a packing that is mounted on an outer circumferential part of the rod member and slides along a slide hole. Assembly is simple because a conventional hard piston is not used. The assembly can be carried out simply by hand without the use of a dedicated tool. Thus, the rod assembly simplifies assembly work.

11 Claims, 14 Drawing Sheets

(51) Int. Cl.
*F16J 15/3268* (2016.01)
*F15B 15/28* (2006.01)

(58) Field of Classification Search
USPC .......................................................... 92/109
See application file for complete search history.

(56) References Cited

U.S. PATENT DOCUMENTS

| | | | | |
|---|---|---|---|---|
| 5,813,313 | A * | 9/1998 | Stoll | F15B 15/2807 92/244 |
| 5,947,001 | A * | 9/1999 | Evans, Jr. | F15B 15/1447 91/1 |
| 7,395,749 | B2 * | 7/2008 | Adams | F15B 15/227 91/395 |
| 7,650,828 | B2 * | 1/2010 | Rau | F15B 15/2861 92/5 R |
| 8,505,437 | B2 * | 8/2013 | Nishi | F15B 15/226 92/177 |
| 2006/0162551 | A1 | 7/2006 | Muller | |
| 2006/0285978 | A1 | 12/2006 | Yajima et al. | |
| 2014/0157981 | A1 | 6/2014 | Saito et al. | |
| 2015/0226325 | A1 | 8/2015 | Bueter | |
| 2015/0354608 | A1 | 12/2015 | Jene et al. | |

FOREIGN PATENT DOCUMENTS

| | | | | |
|---|---|---|---|---|
| CN | 104895862 | A | | 9/2015 |
| CN | 205118244 | U | | 3/2016 |
| DE | 2730112 | A1 * | 1/1979 | F16J 1/008 |
| DE | 94 16 082.1 | U1 | | 12/1994 |
| EP | 0 093 859 | A2 | | 11/1983 |
| EP | 0 836 011 | A2 | | 4/1998 |
| GB | 1103118 | A | | 2/1968 |
| JP | 1-171905 | U | | 12/1989 |
| JP | 3-43139 | U | | 4/1991 |
| JP | 3-80109 | U | | 8/1991 |
| JP | 6-32495 | U | | 4/1994 |
| JP | 11-132204 | A | | 5/1999 |
| JP | 5377308 | B2 | | 12/2013 |
| JP | 2014-114874 | A | | 6/2014 |
| KR | 10-0777412 | B1 | | 11/2007 |

OTHER PUBLICATIONS

Combined Chinese Office Action and Search Report dated Dec. 6, 2019, in Patent Application No. 201780075333.2, 17 pages (with unedited computer generated English translation and English Translation of Category of Cited Documents).

International Search Report dated Jan. 16, 2018 in PCT/JP2017/040680 filed Nov. 13, 2017.

Office Action dated Jul. 20, 2020 in corresponding Korean Patent Application No. 10-2019-7019428 (with English Translation), 13 pages.

Russian Office Action dated Oct. 21, 2020 in Russian Patent Application No. 2019120895 (with English language translation), 12 pages.

Chinese Office Action dated Jun. 11, 2020 in Chinese Patent Application No. 201780075333.2 (with English language translation), 15 pages.

Extended European Search Report dated Jun. 30, 2020 in Patent Application No. 17878720.6, 10 pages.

* cited by examiner

10A

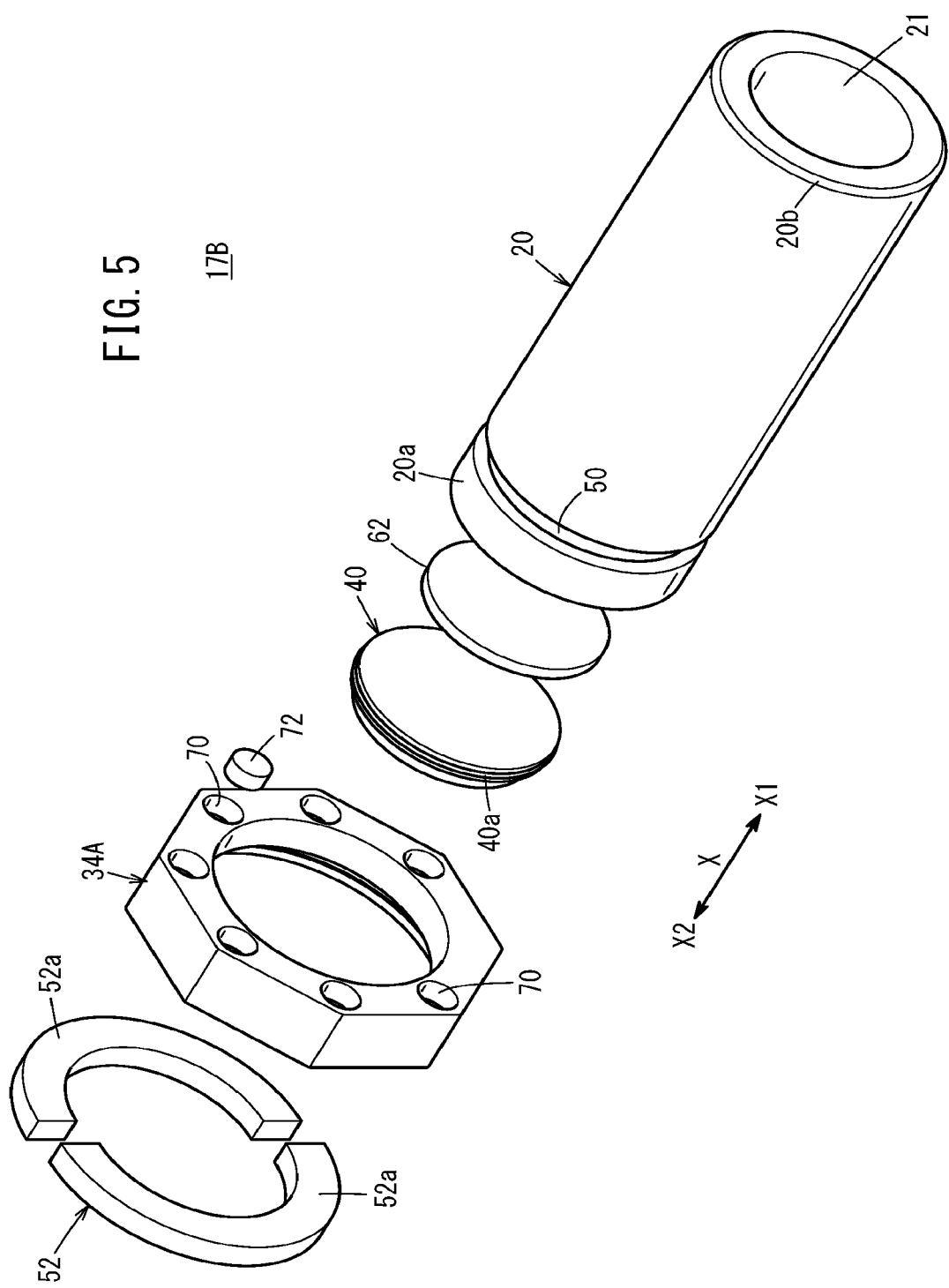

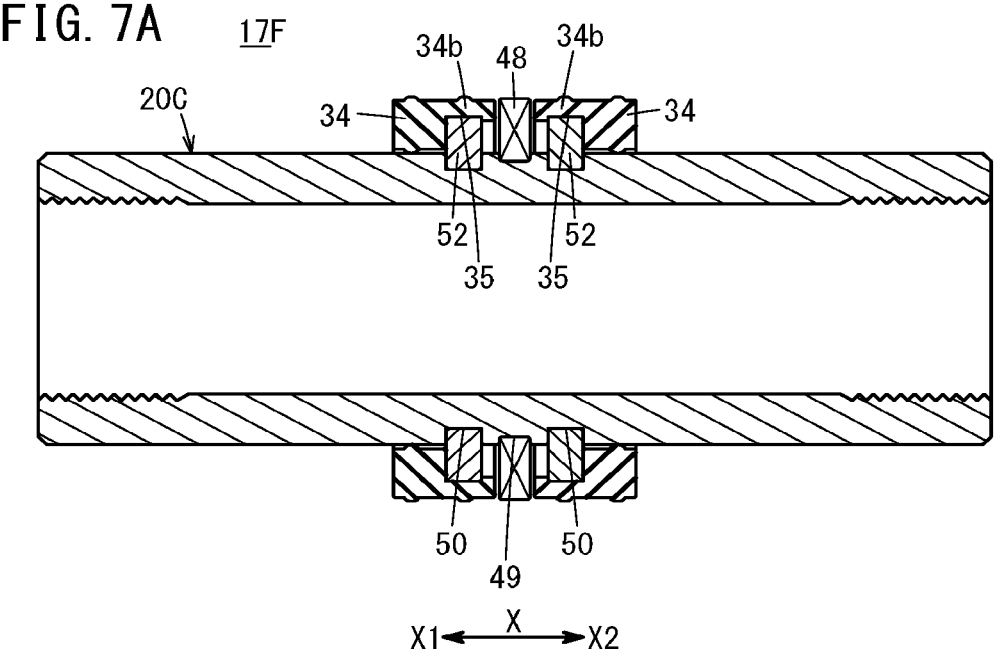
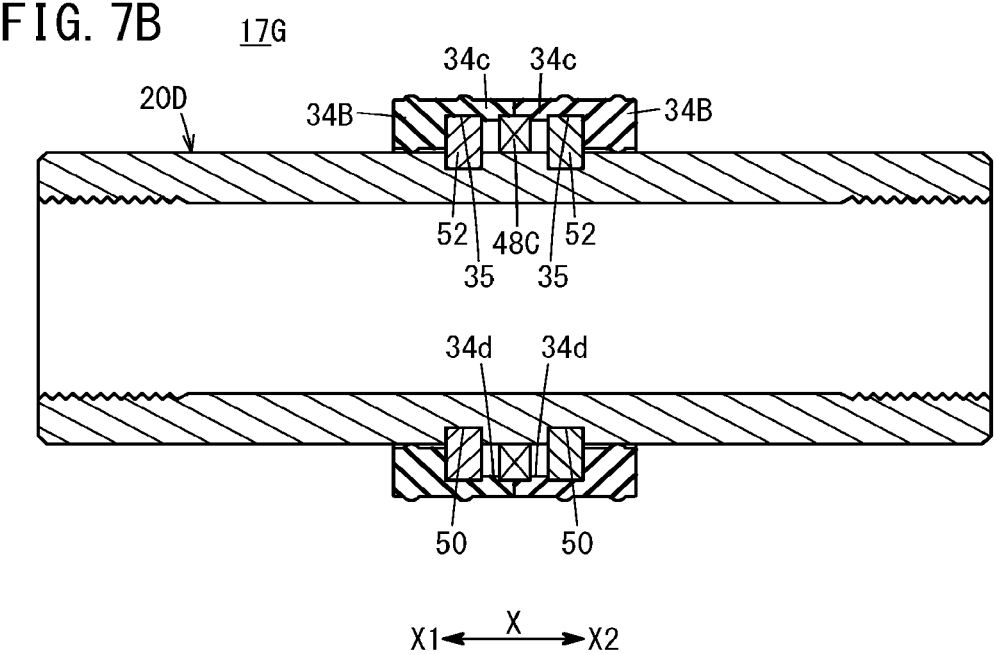

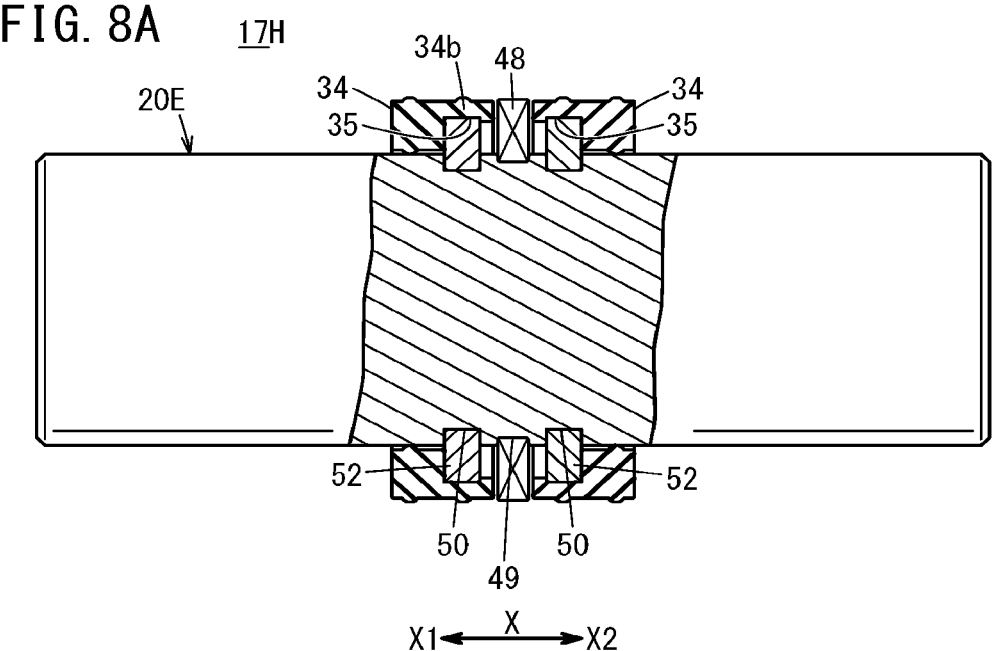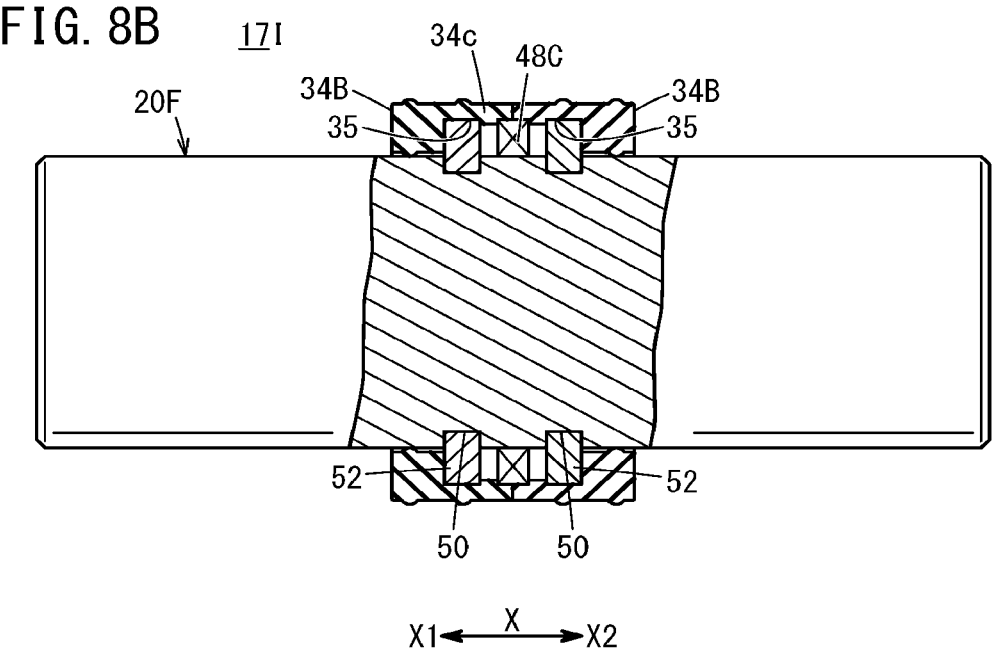

ROD ASSEMBLY AND FLUID PRESSURE DEVICE

TECHNICAL FIELD

The present invention relates to a rod assembly reciprocating along a slide hole and a fluid pressure device.

BACKGROUND ART

Conventionally, various devices are known as fluid pressure devices provided with pistons. For example, fluid pressure cylinders including pistons configured to be displaced by the effect of supplied pressurized fluid are well known as means (actuators) for transporting workpieces and the like. A typical fluid pressure cylinder includes a cylinder tube, a piston disposed inside the cylinder tube to be movable in the axial direction, and a piston rod connected to the piston (for example, see Japanese Laid-Open Patent Publication No. 2014-114874 below). In such a fluid pressure cylinder, when pressurized fluid such as air is supplied into the cylinder tube, the piston is pushed by the pressurized fluid and displaced in the axial direction. This also causes the piston rod connected to the piston to be displaced in the axial direction.

SUMMARY OF INVENTION

A piston and a piston rod in a conventional fluid pressure device are assembled together by, for example, inserting one end portion of the piston rod into a hole formed in the central part of the piston and swaging or crimping (plastically deforming) the one end portion. The assembly requires specific tools or devices and thus is complicated.

The present invention has been devised taking into consideration the aforementioned problems, and has the object of providing a rod assembly and a fluid pressure device capable of being assembled through a simplified process.

To achieve the above-described object, a rod assembly configured to reciprocate along a slide hole of a fluid pressure device according to the present invention includes a rod member and a packing attached to an outer circumferential part of the rod member and configured to slide along the slide hole.

The rod member may include, in the outer circumferential part, a stopper receiving groove extending in a circumferential direction. A stopper member divided into a plurality of elements in the circumferential direction may be installed into the stopper receiving groove. The packing may cover the stopper member, and thus the stopper member may support the packing and may be prevented from coming off the stopper receiving groove.

The packing may also function as a damper configured to relieve impact occurring when the rod member reaches a stroke end.

The rod member may have a hollow shape.

A damper member configured to relieve impact occurring when the rod member reaches a stroke end may be attached to an end portion of the rod member, and the damper member may airtightly or liquid-tightly block up a hollow portion of the rod member.

An outer circumferential part of the damper member may be attached to an inner circumferential part of the rod member.

A supporting member configured to be harder than the damper member and to support the damper member may be disposed in the hollow portion of the rod member.

The rod member may include a magnet receiving groove in an outer circumferential part thereof, and a magnet having an annular shape may be installed in the magnet receiving groove.

The packing may be provided with at least one magnet receiving groove having a depth in an axial direction, and a magnet may be installed in the at least one magnet receiving groove.

An outer circumference of the packing may have a non-circular shape, the at least one magnet receiving groove may include a plurality of magnet receiving grooves disposed at intervals in a circumferential direction, and the magnet may be installed in only part of the plurality of magnet receiving grooves.

A fluid pressure device according to the present invention includes a body containing therein a slide hole and a rod assembly disposed so as to reciprocate along the slide hole, wherein the rod assembly includes a rod member and a packing attached to an outer circumferential part of the rod member and configured to slide along the slide hole.

The fluid pressure device may be configured as a fluid pressure cylinder, a valve device, a length-measurement cylinder, a sliding table, or a chuck device.

In accordance with the rod assembly and the fluid pressure device according to the present invention, the packing is attached to the outer circumferential part of the rod member. Thus, a hitherto-used hard piston member can be omitted, enabling easy assembly of the rod assembly. The assembly can be easily performed by hand without using any specific tools. Consequently, according to the present invention, the assembly work of the rod assembly can be simplified. Moreover, consumption of pressurized fluid (air or the like) when the rod member moves toward at least one side during the reciprocating motion inside the slide hole can be reduced by increasing the outer diameter of the rod member.

The above-described object, features, and advantages will become more apparent from the following description of preferred embodiments in conjunction with the accompanying drawings.

BRIEF DESCRIPTION OF DRAWINGS

FIG. 5 is a perspective view of the rod assembly according to the second embodiment viewed from a side on which a rod member lies;

FIG. 7A is a cross-sectional view of a rod assembly according to a sixth embodiment, and FIG. 7B is a cross-sectional view of a rod assembly according to a seventh embodiment;

FIG. 8A is a cross-sectional view of a rod assembly according to an eighth embodiment, and FIG. 8B is a cross-sectional view of a rod assembly according to a ninth embodiment;

DESCRIPTION OF EMBODIMENTS

Preferred embodiments of a rod assembly and a fluid pressure device according to the present invention will be described in detail below with reference to the accompanying drawings.

Figure 1:
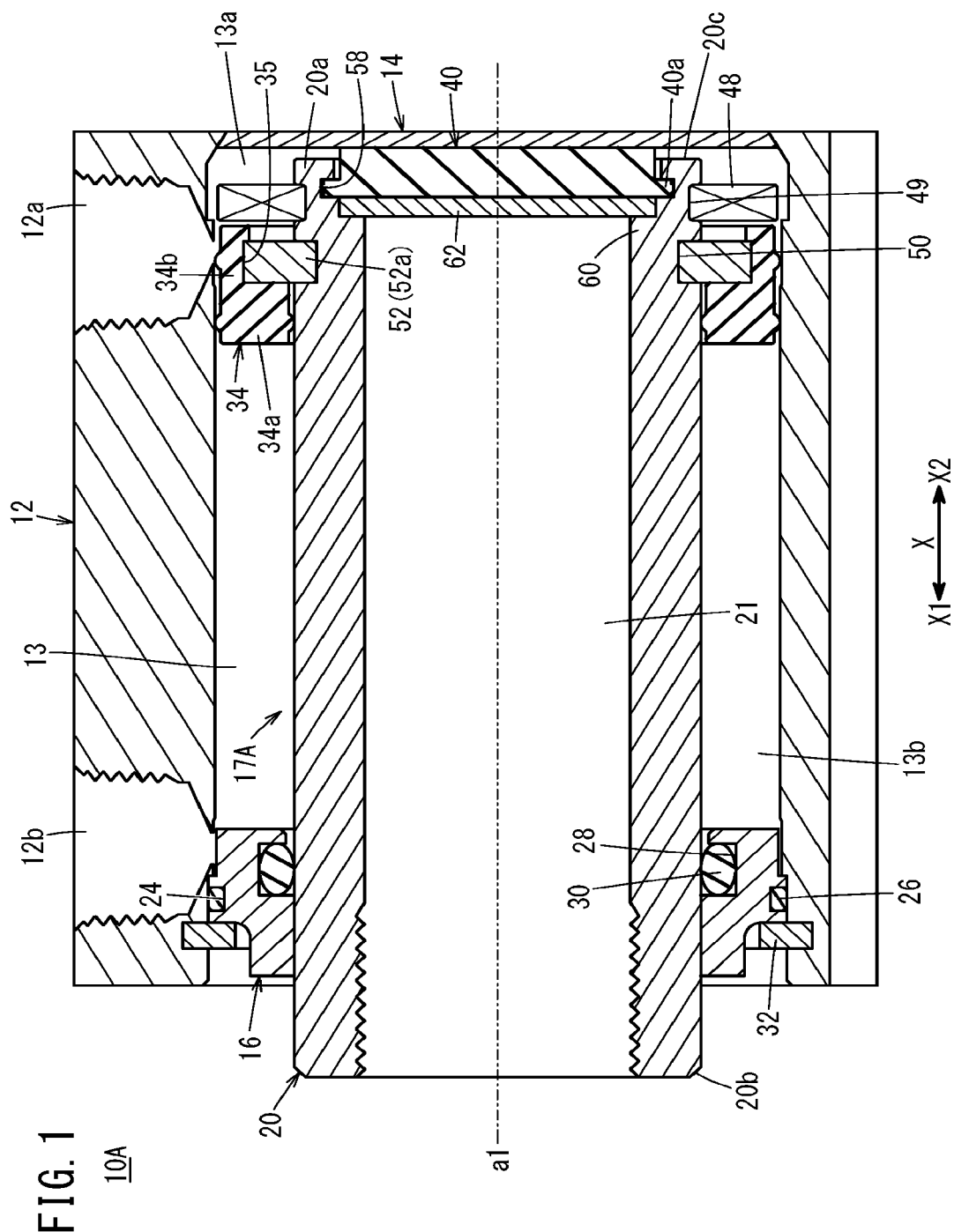
FIG. 1 is a cross-sectional view of a fluid pressure cylinder provided with a rod assembly according to a first embodiment.

A fluid pressure cylinder 10A illustrated in FIG. 1 as an example of a fluid pressure device is provided with a cylinder tube 12 (body) having a hollow tubular shape, a head cover 14 disposed at one end portion of the cylinder tube 12, a rod cover 16 disposed at another end portion of the cylinder tube 12, and a rod assembly 17A disposed to be able to reciprocate in the axial direction of the cylinder tube 12. The fluid pressure cylinder 10A is used as an actuator for, for example, transporting a workpiece.

The cylinder tube 12 is a tubular body composed of, for example, a metal material such as aluminum alloy and extending in the axial direction. In this embodiment, the cylinder tube 12 has a hollow cylindrical shape. The cylinder tube 12 has a first port 12a disposed adjacent to one end in the axial direction (i.e., an end located in the direction of an arrow X2), a second port 12b disposed adjacent to another end in the axial direction (i.e., an end located in the direction of an arrow X1), and a slide hole (cylinder chamber) communicating with the first port 12a and the second port 12b.

The head cover 14 is a plate-shaped body composed of, for example, a metal material similar to that of the cylinder tube 12 and is disposed to block up the one end portion (the end portion located in the X2 direction) of the cylinder tube 12. The head cover 14 hermetically closes the one end portion of the cylinder tube 12.

The rod cover 16 is a circular ring-shaped member composed of, for example, a metal material similar to that of the cylinder tube 12 and is disposed to block up the other end portion (the end portion located in the X1 direction) of the cylinder tube 12. An outer annular groove 24 is formed in an outer circumferential part of the rod cover 16. An outer sealing member 26 composed of an elastic material is installed into the outer annular groove 24 to seal a gap between the outer circumferential surface of the rod cover 16 and the inner circumferential surface of the slide hole 13.

An inner annular groove 28 is formed in an inner circumferential part of the rod cover 16. An inner sealing member 30 composed of an elastic material is installed into the inner annular groove 28 to seal a gap between the inner circumferential surface of the rod cover 16 and the outer circumferential surface of a rod member 20. The rod cover 16 is locked by a stopper 32 secured to an inner circumferential part of the cylinder tube 12 adjacent to the other end of the cylinder tube 12.

The rod assembly 17A includes the rod member 20 extending in the axial direction of the slide hole 13 and a packing 34 attached to an outer circumferential part of the rod member 20. The rod member 20 has a hollow shape (a hollow cylindrical shape in the first embodiment) and includes a hollow portion 21 passing through in the axial direction.

The rod member 20 penetrates through the rod cover 16. A distal end portion 20b, which is the opposite end of one end portion 20a (hereinafter referred to as "a base end portion 20a") of the rod member 20, is exposed to the outside of the slide hole 13. The constituent material of the rod member 20 includes, for example, metal materials such as carbon steel, stainless steel, and aluminum alloy, and hard resin.

The packing 34 is accommodated inside the cylinder tube (slide hole 13) to be slidable in the axial direction and partitions the inside of the slide hole 13 into a first pressure chamber 13a adjacent to the first port 12a and a second pressure chamber 13b adjacent to the second port 12b. In this embodiment, the packing 34 is attached to the base end portion 20a of the rod member 20.

The packing 34 is an annular member protruding radially outward from the rod member 20. The outer diameter of the packing 34 is larger than the outer diameter of the rod member 20. The rod member 20 is provided with an annular stopper receiving groove 50 and an annular magnet receiving groove 49, which are formed in an outer circumferential part of the rod member in the vicinity of the base end portion 20a so as to be spaced in the axial direction.

The packing 34 is a circular ring-shaped sealing member (for example, O-ring) composed of an elastic body and attached to the outer circumferential part of the rod member 20, and is disposed to surround the rod member 20. The constituent material of the packing 34 includes, for example, elastic materials such as rubber and elastomer (urethane rubber and the like).

The outer circumferential surface of the packing 34 airtightly or liquid-tightly contacts with the inner circumferential surface of the slide hole 13 over the entire circumference. The inner circumferential surface of the packing 34 airtightly or liquid-tightly contacts with the outer circumferential part (outer circumferential surface) of the rod member 20 over the entire circumference. Thus, the packing 34 airtightly or liquid-tightly separates the first pressure chamber 13a and the second pressure chamber 13b from each other inside the slide hole 13.

In this manner, the rod assembly 17A includes the packing 34, which is attached to the outer circumferential part of the rod member 20 so as to airtightly or liquid-tightly separate the first pressure chamber 13a and the second pressure chamber 13b from each other. Thus, unlike typical fluid pressure cylinders, the fluid pressure cylinder has a piston-less structure without a piston member made of a hard material. Alternatively, the packing 34 can be regarded as functioning as a piston in the rod assembly 17A.

Moreover, the packing 34 also functions as a damper (first damper) relieving impact occurring when the rod member reaches a stroke end on the rod cover 16 side.

The packing 34 is attached to a stopper member 52 so as to cover the stopper member 52. The stopper member 52 has a circular ring shape and is installed into the stopper receiving groove 50 of the rod member 20.

The packing 34 has an L-shaped cross-section and includes a packing body portion 34a covering a side of the stopper member 52 facing the rod cover 16 (a side located in the direction of the arrow X1) and a circumference covering portion 34b covering the outer circumference of the stopper member 52. The circumference covering portion 34b protrudes from an outer circumferential part of the packing body portion 34a in the axial direction.

Figure 2:
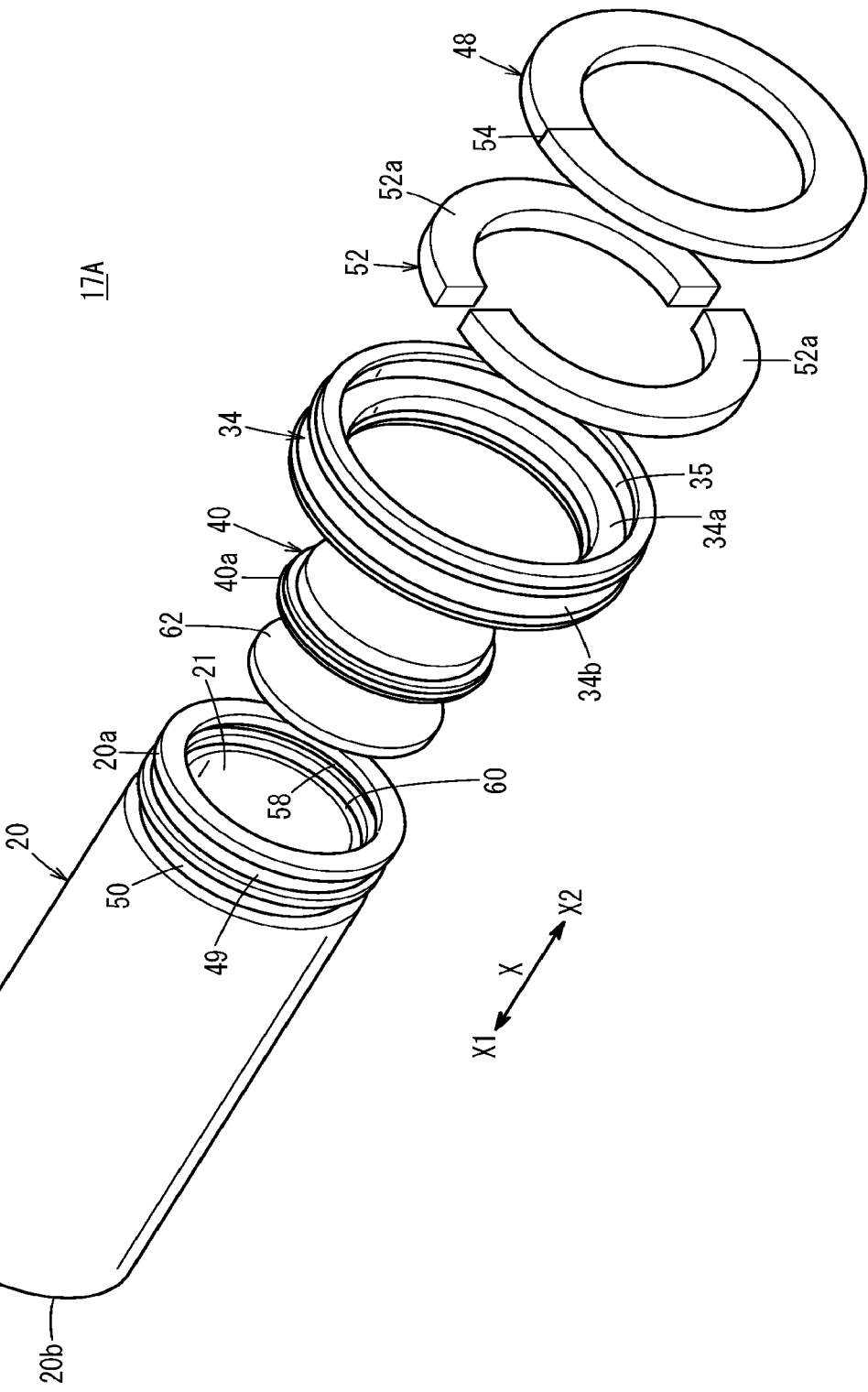
FIG. 2 is a perspective view of the rod assembly.

As shown in FIG. 2, the stopper member 52 includes a plurality of circumferentially-segmented stopper elements 52a. Each of the stopper elements 52a is arc-shaped. In the first embodiment, the stopper member 52 is divided into halves and thus consists of the two stopper elements 52a of semicircular arcs. In FIG. 1, the inner circumference of the stopper member 52 (inner circumferences of the stopper elements 52a) is installed into the stopper receiving groove 50. The stopper member 52 is made of a hard material, for example, a material similar to the above-described material of the rod member 20.

The circumference covering portion 34b is attached to the outer circumference of the stopper member 52. Thus, the packing 34 is supported by the stopper member 52. Moreover, since the packing 34 is attached to the stopper member 52, the stopper member 52 is prevented from coming off the stopper receiving groove 50.

The circumference covering portion 34b has an annular engaging groove 35 formed in an inner circumferential part thereof. The outer circumference of the stopper member 52 engages with the annular engaging groove 35 of the circumference covering portion 34b. In a state where the rod assembly 17A is disposed inside the slide hole 13, the circumference covering portion 34b is pushed radially inward by the inner circumferential surface defining the slide hole 13. This prevents the circumference covering portion 34b having the annular engaging groove 35 from coming off the outer circumference of the stopper member 52.

The rod member 20 and the packing 34 are rotatable relative to each other about an axis al of the packing 34.

During an assembly process of the rod assembly 17A, the stopper member 52 and the packing 34 are attached to the rod member 20 as follows. First, the two stopper elements 52a are individually attached to (fitted into) the stopper receiving groove 50 of the rod member 20 so as to form the annular stopper member 52. Next, the packing 34 is moved on the rod member 20 from the distal end portion 20b side toward the base end portion 20a side, and then the packing 34 covers the stopper member 52 (two stopper elements 52a). Thus, the stopper member 52 is prevented from coming off the stopper receiving groove 50, and the packing 34 is held at a predetermined position on the outer circumferential part of the rod member 20.

A magnet 48 is a circular ring-shaped member installed into the outer circumferential part (magnet receiving groove 49) of the rod member 20. The magnet 48 is elastically deformable. The magnet 48 is a plastic magnet having a slit 54 (gap) at a location in the circumferential direction. Thus, the magnet 48 elastically deforms when being installed into the magnet receiving groove 49, enabling an easy installation.

The magnet 48 is disposed at a position adjacent to the packing 34. An end surface of the magnet 48 facing the packing 34 is in contact with an end surface of the packing 34 facing the magnet 48. The end surface of the magnet 48 facing the packing 34 may not be in contact with the end surface of the packing 34 facing the magnet 48.

Magnetic sensors (not illustrated) are attached to the outer surface of the cylinder tube 12 at positions corresponding to both stroke ends of the packing 34 and the magnet 48. The magnetic sensors detect magnetism generated by the magnet 48 to thereby detect the working position of the rod assembly 17A.

A damper member 40 (second damper) relieving impact occurring when the rod member reaches a stroke end on the head cover 14 side is disposed at the base end portion 20a of the rod member 20. The damper member 40 is attached to an inner circumferential part of the base end portion 20a of the rod member 20 and protrudes from an end surface 20c of the rod member 20 located at the base end portion 20a toward the head cover 14 (in the direction of the arrow X2). In the first embodiment, the damper member 40 has a circular shape.

The damper member 40 is provided with an annular (circular ring-shaped) flange portion 40a protruding radially outward. The flange portion 40a engages with an annular engaging recess 58 formed in the inner circumferential part of the base end portion 20a of the rod member 20. The engagement between the flange portion 40a and the annular engaging recess 58 prevents the damper member 40 from coming off the base end portion 20a of the rod member 20.

The rod member 20 has a stepped portion 60 formed on an inner circumferential part of the base end portion 20a. A supporting member 62 is disposed on the stepped portion 60. The supporting member 62 is a circular plate-shaped member and is held between the stepped portion 60 and the damper member 40. The supporting member 62 supports the damper member 40 and prevents the damper member 40 from being bent by pressure from pressurized fluid. Thus, the supporting member 62 is configured to be harder than the damper member 40. The supporting member 62 is made of a hard material, for example, a material similar to the material of the above-described rod member 20.

In FIG. 1, an outer circumferential part of the damper member 40 is in close contact with the inner circumferential part of the rod member 20 over the entire circumference and thus airtightly or liquid-tightly closes an opening of the rod member 20 at the base end portion 20a. That is, the damper member 40 also functions as a sealing member for airtightly or liquid-tightly blocking up the hollow portion 21 of the rod member 20.

Next, the effects and advantages of the fluid pressure cylinder 10A illustrated in FIG. 1 configured as above will be described. In the fluid pressure cylinder 10A, the rod assembly 17A is reciprocated in the axial direction by the effect of pressurized fluid (for example, compressed air) introduced via the first port 12a or the second port 12b.

Specifically, to advance the rod assembly 17A (move the rod assembly 17A in the direction of the arrow X1), the pressurized fluid is supplied from a pressurized fluid supply source (not illustrated) to the first pressure chamber 13a via the first port 12a while the second port 12b is exposed to the atmosphere. This causes the pressurized fluid to push the rod assembly 17A toward the rod cover 16, whereby the rod assembly 17A is advanced.

When the packing 34 comes into abutment against the end surface of the rod cover 16, the advancing motion of the rod assembly 17A stops. In this case, since the packing 34 is made of an elastic material, impact and impact noise occurring when the rod assembly 17A reaches an advanced position (the stroke end on the rod cover 16 side) are effectively prevented or reduced.

On the other hand, to retract the rod assembly 17A (move the rod assembly 17A in the direction of the arrow X2), the pressurized fluid is supplied from the pressurized fluid supply source (not illustrated) to the second pressure chamber 13b via the second port 12b while the first port 12a is exposed to the atmosphere. This causes the pressurized fluid to push the rod assembly 17A toward the head cover 14, whereby the rod assembly 17A is retracted (returning action).

When the damper member 40 comes into abutment against the head cover 14, the retracting motion of the rod assembly 17A stops. In this case, the damper member 40 made of an elastic material prevents the rod member 20 and the head cover 14 from coming into direct contact with each other. Thus, impact and impact noise occurring when the rod assembly 17A reaches a retracted position (the stroke end on the head cover 14 side) are effectively prevented or reduced.

In this case, the packing 34 is attached to the outer circumferential part of the rod member 20 in the rod assembly 17A according to this embodiment. Thus, a hitherto-used hard piston member can be omitted, enabling easy assembly of the rod assembly 17A. The assembly can be easily performed by hand without using any specific tools. Consequently, the rod assembly 17A of the present invention can simplify the assembly work. Moreover, by increasing the outer diameter of the rod member 20, it is possible to reduce consumption of pressurized fluid (air or the like) when the rod member moves toward at least one side (when moving toward the head cover 14 (retracting) in the first embodiment) during the reciprocating motion inside the slide hole 13.

In this embodiment, the rod member 20 has, formed in the outer circumferential part, the stopper receiving groove 50 extending in the circumferential direction, and the stopper member 52, which is circumferentially divided into the plurality of elements, is installed into the stopper receiving groove 50. In addition, the packing 34 covers the stopper member 52. Thus, the packing 34 is supported by the stopper member 52, and the stopper member 52 is prevented from coming off the stopper receiving groove 50. This structure enables the packing 34 to be easily attached to the outer circumferential part of the rod member 20 and allows the attachment state to be stably maintained.

The packing 34 also functions as a damper for relieving impact occurring when the rod member reaches one of the stroke ends (on the rod cover 16 side in the first embodiment). Thus, impact load is successfully prevented from being transmitted to the rod member 20 when the rod member reaches the one of the stroke ends.

In this embodiment, the rod member 20 has a hollow shape. This leads to a reduction in the weight of the rod assembly 17A. In addition, the reduction in the weight of the rod assembly 17A leads to a reduction in the consumption of the pressurized fluid, resulting in energy savings.

Figure 3:
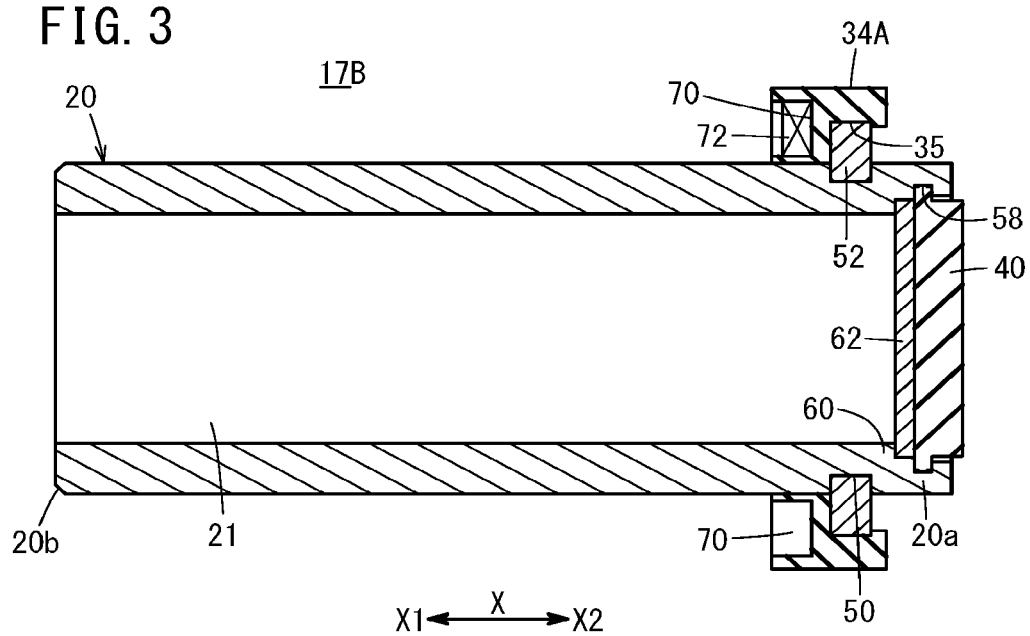
FIG. 3 is a cross-sectional view of a rod assembly according to a second embodiment.

In this embodiment, the rod member 20 and the packing 34 are rotatable relative to each other about the axis al of the packing 34. This conveniently allows the rod member 20 to easily rotate during installation of the fluid pressure cylinder 10A in a facility. Moreover, as described below, the rod member 20 is also rotatable in a rod assembly 17B (FIG. 3) provided with a polygonal packing 34A.

In this embodiment, the damper member 40 also functions as a sealing member for airtightly or liquid-tightly blocking up the hollow portion 21 of the rod member 20. Thus, the number of parts can be reduced compared with a structure including a damper and a sealing member separately.

The present invention is not limited to the above circular packing 34, and is also applicable to the polygonal packing 34A. Thus, instead of the rod assembly 17A provided with the circular packing 34, the fluid pressure cylinder 10A may adopt the rod assembly 17B provided with the polygonal packing 34A shown in FIGS. 3 to 5.

Figure 4:
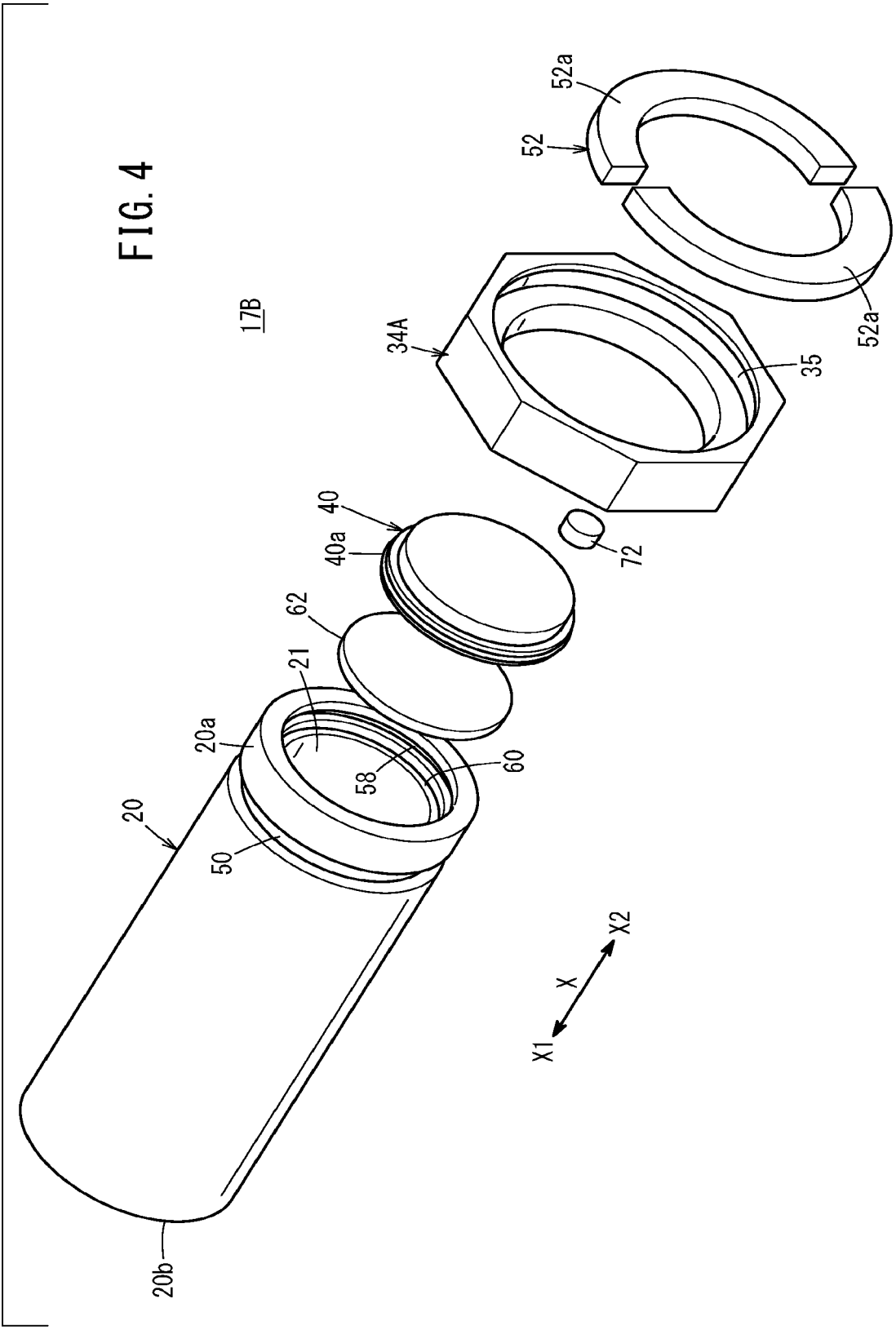
FIG. 4 is a perspective view of the rod assembly according to the second embodiment viewed from a side on which a packing lies.

As illustrated in FIGS. 4 and 5, the outer circumference of the packing 34A of the rod assembly 17B has an octagonal shape. The inner circumference of the packing 34A has a circular shape. As shown in FIG. 5, the packing 34A has a plurality of magnet receiving grooves 70 disposed at intervals in the circumferential direction. Specifically, the plurality of magnet receiving grooves 70 are formed in one surface of the packing 34A and have a depth in the axial direction of the packing 34A. A magnet 72 is installed in each of the magnet receiving grooves 70. The magnet 72 is, for example, a ferrite magnet, a rare earth magnet, or the like.

The other part of the rod assembly 17B is configured similarly to the rod assembly 17A.

The rod assembly 17B yields effects similar to the effects of the rod assembly 17A. For example, the rod assembly 17B can also be easily assembled by hand without using any specific tools.

The above-described rod assembly 17A (FIG. 1) adopts the rod member 20 having a hollow structure. However, as in rod assemblies 17C to 17E respectively shown in FIGS. 6A to 6C, rod members 20A, 20B having a solid structure may be adopted.

Figure 6A:
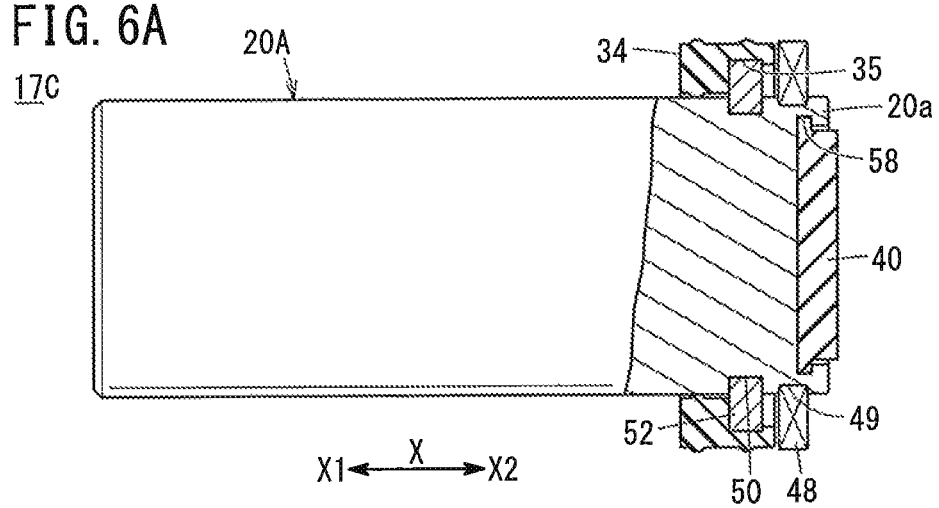
FIG. 6A is a cross-sectional view of a rod assembly according to a third embodiment.

The rod assembly 17C in FIG. 6A adopts the rod member 20A having a solid structure, instead of the rod member 20 in the rod assembly 17A (FIG. 1).

Figure 6B:
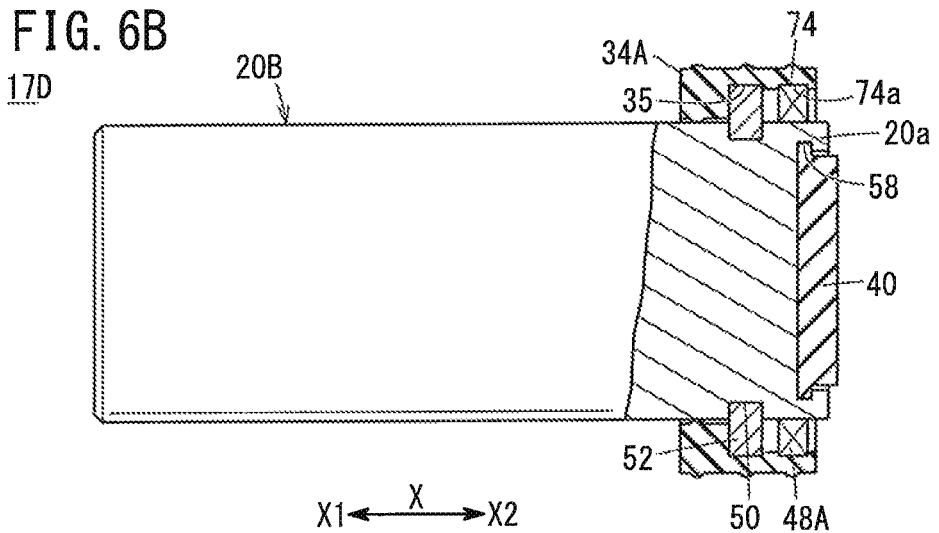
FIG. 6B is a cross-sectional view of a rod assembly according to a fourth embodiment.

The packing 34A of the rod assembly 17D in FIG. 6B has a magnet holding portion 74 formed by extending the circumference covering portion 34b of the packing 34 of the rod assembly 17A (FIG. 1) in the axial direction so as to hold a magnet 48A (a magnet having a smaller outer diameter and a larger inner diameter than the magnet 48 of FIG. 1).

The magnet 48A is held between the magnet holding portion 74 and an outer circumferential part of the rod member 20B. A magnet-holding annular groove 74a is formed in the inner circumferential surface of the magnet holding portion 74. The outer circumference of the magnet 48A is fitted (engaged) into the magnet-holding annular groove 74a. The rod assembly 17D adopts the rod member 20B without a magnet receiving groove in the outer circumferential part.

Figure 6C:
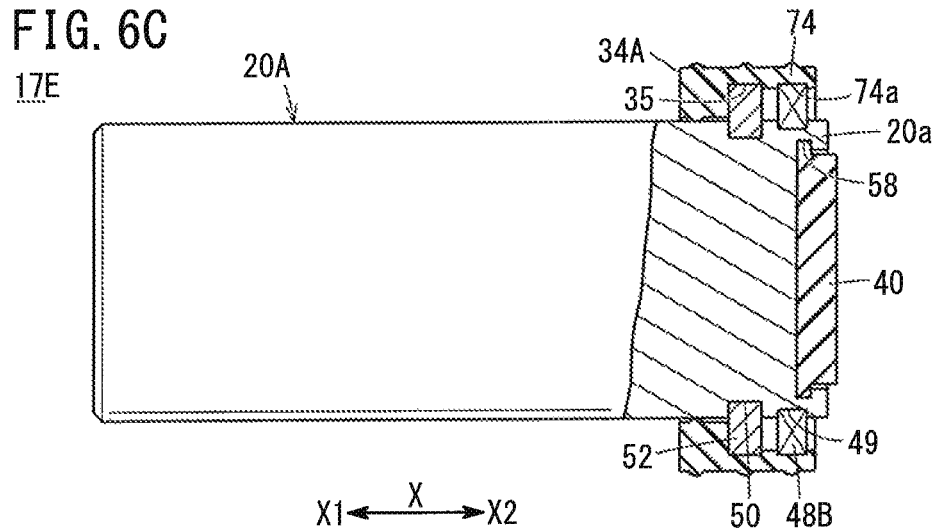
FIG. 6C is a cross-sectional view of a rod assembly according to a fifth embodiment.

As in the rod assembly 17E in FIG. 6C, the rod member 20A provided with the magnet receiving groove 49 in an outer circumferential part and the packing 34A provided with the magnet holding portion 74 may be combined. In this case, a magnet 48B (a magnet having a smaller outer diameter than the magnet 48 shown in FIG. 1) is held between the magnet holding portion 74 and the magnet receiving groove 49.

The above-described rod assembly 17A (FIG. 1) adopts the rod member 20, which elongates and protrudes toward only one side of the packing 34. However, as in rod assemblies 17F, 17G respectively shown in FIGS. 7A, 7B, rod members 20C and 20D protruding toward both sides of the packings 34 and packings 34B, respectively, may be adopted.

The rod assembly 17F shown in FIG. 7A includes the hollow rod member 20C having the two stopper receiving grooves 50 and the one magnet receiving groove 49 in an outer circumferential part and the two packings 34 attached to the outer circumferential part of the rod member 20C. The magnet receiving groove 49 is disposed between the two stopper receiving grooves 50. The two stopper members 52 are installed in the respective stopper receiving grooves 50. The two packings 34 are attached to the respective stopper members 52. The magnet 48 is disposed between the two packings 34.

The rod assembly 17G shown in FIG. 7B adopts the hollow rod member 20D without a magnet receiving groove in an outer circumferential part. The two packings 34B each including a circumference covering portion 34c formed by extending the circumference covering portion 34b of the packing 34 (FIG. 7A) in the axial direction are attached to the outer circumferential part of the rod member 20D.

The circumference covering portion 34c of each packing 34B includes a magnet-holding stepped portion 34d. The two packings 34B hold a magnet 48C (a magnet having a smaller outer diameter and a larger inner diameter than the magnet 48 illustrated in FIG. 7A) between the magnet-holding stepped portions 34d to thereby regulate the axial movement of the magnet 48C and to cover the outer circumference of the magnet 48C with the circumference covering portions 34c.

As in rod assemblies 17H and 17I respectively shown in FIGS. 8A and 8B, rod members 20E and 20F each having a solid structure and protruding toward both sides of the packings 34 and packings 34B, respectively, may be adopted.

Figure 9A:
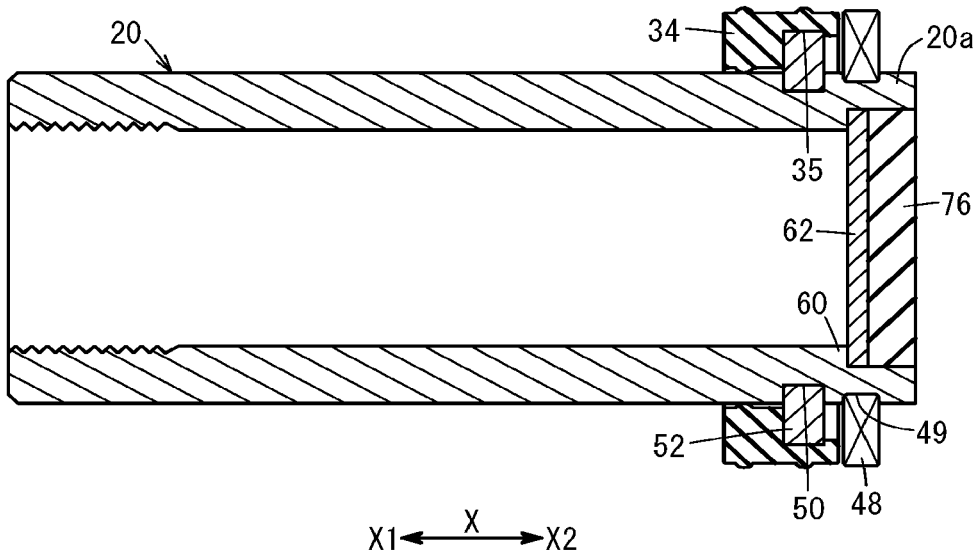
FIG. 9A is a cross-sectional view of a rod assembly according to a tenth embodiment.

In the rod assembly 17A (FIG. 1), the rod member 20 has the damper member 40 at the base end portion 20a. However, as in a rod assembly 17J shown in FIG. 9A, the rod member 20 may not be provided with any damper member at the base end portion 20a. In this case, the opening of the rod member 20 at the base end portion 20a is airtightly or liquid-tightly closed by a sealing member 76.

Figure 9B:
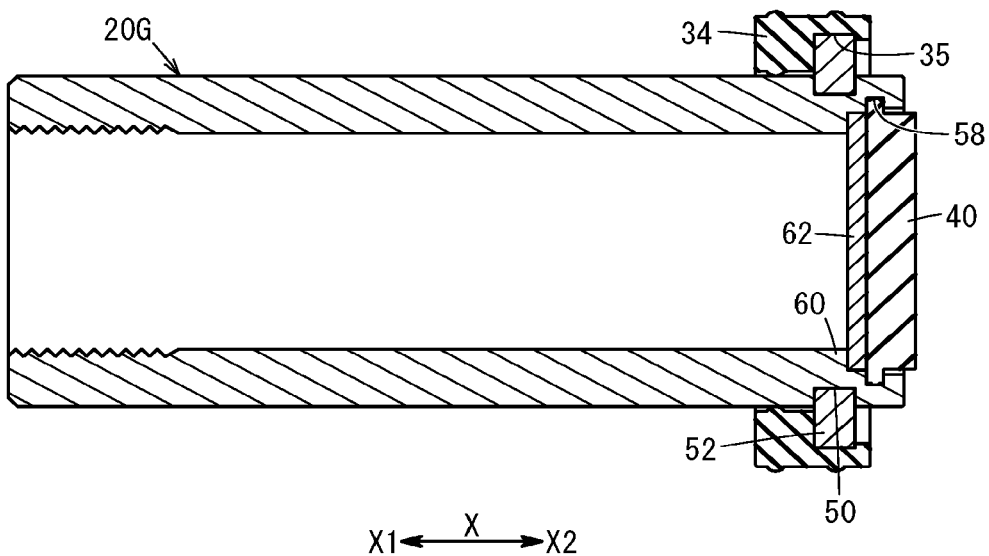
FIG. 9B is a cross-sectional view of a rod assembly according to an eleventh embodiment.

A rod assembly 17K may be configured, as shown in FIG. 9B, by omitting the magnet 48 from the rod assembly 17A (FIG. 1). The rod assembly 17K adopts a rod member 20G without a magnet receiving groove in the outer circumferential part.

Figure 10A:
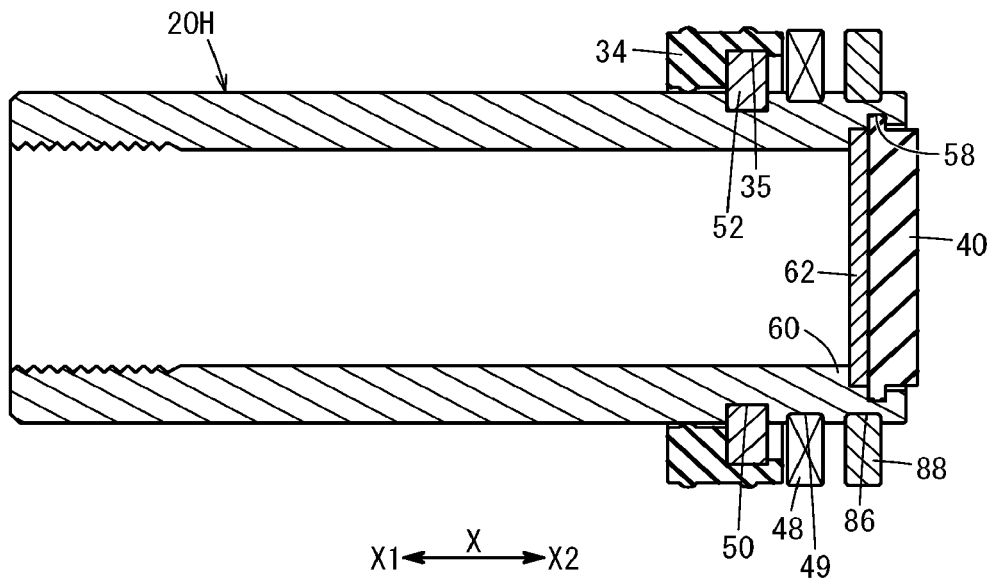
FIG. 10A is a cross-sectional view of a rod assembly according to a twelfth embodiment.

As in a rod assembly 17L shown in FIG. 10A, a rod member 20H having an annular wear ring receiving groove 86 in an outer circumferential part may be adopted, and a wear ring 88 made of a low friction material may be installed into the wear ring receiving groove 86. The wear ring 88 is an annular member for preventing the outer circumferential surface of the magnet 48 from coming into contact with the inner circumferential surface defining the slide hole 13.

The wear ring 88 is made of a low friction material. Such a low friction material includes, for example, synthetic resins with a low friction and a high resistance to wear, such as polytetrafluoroethylene (PTFE) and metal materials (for example, bearing steel).

Figure 10B:
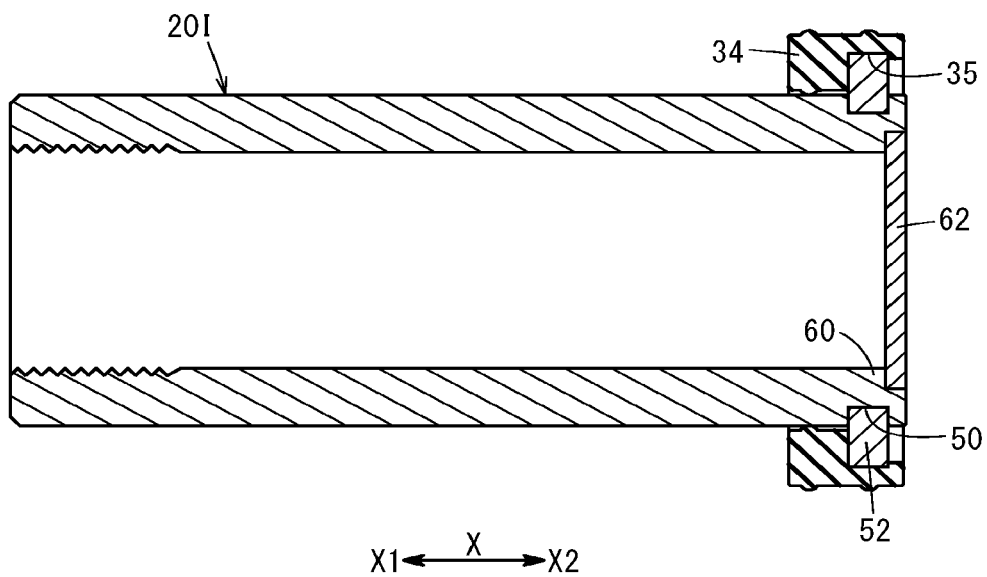
FIG. 10B is a cross-sectional view of a rod assembly according to a thirteenth embodiment.

As in a rod assembly 17M illustrated in FIG. 10B, a rod member 20I without a magnet, a damper member, or a wear ring may be adopted.

Figure 11A:
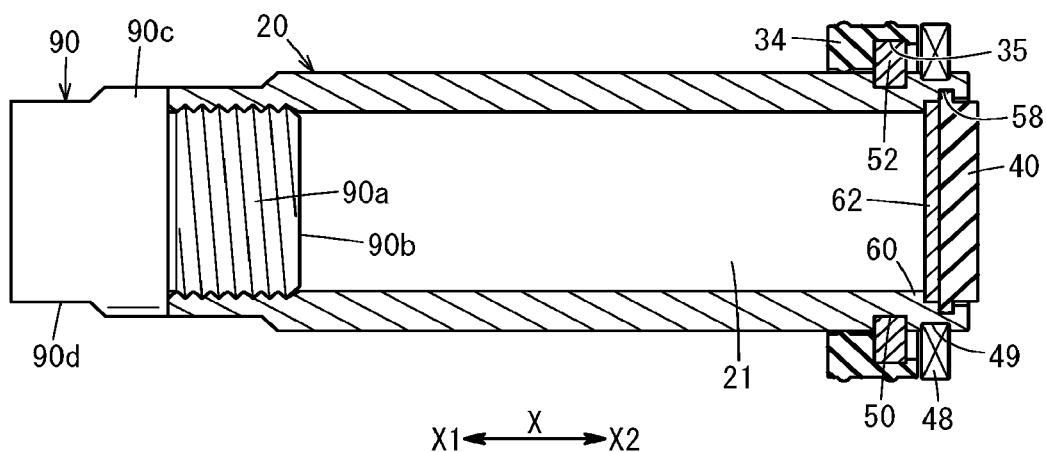
FIG. 11A is a cross-sectional view of a rod assembly according to a fourteenth embodiment.
Figure 11B:
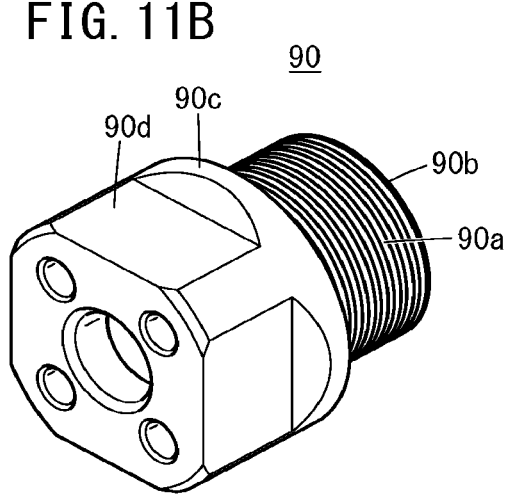
FIG. 11B is a perspective view of a rod end member of a first example.

As in a rod assembly 17N shown in FIG. 11A, a rod end member 90 may be attached to the distal end portion of the rod member 20. As illustrated in FIGS. 11A and 11B, the rod end member 90 includes a shaft portion 90b having a thread portion 90a (external thread) formed on the outer circumference and a head portion 90c provided on an end of the shaft portion 90b. The shaft portion 90b and the head portion 90c are integrally molded. The thread portion 90a is screw-engaged with an inner circumferential part of the distal end of the hollow rod member 20. The head portion 90c has, on an outer circumferential part thereof, a polygonal tool grip portion 90d gripped by a tightening tool. In this case, the rod member 20 is also provided with a tool grip portion.

Figure 11C:
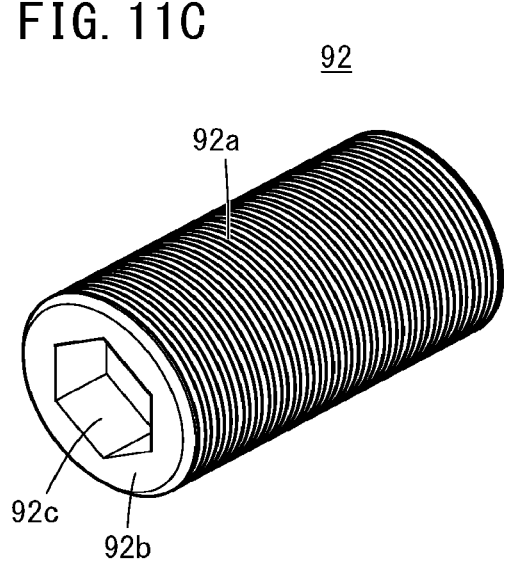
FIG. 11C is a perspective view of a rod end member of a second example.

Instead of the rod end member 90, a rod end member 92 illustrated in FIG. 11C may be attached to the distal end portion of the rod member 20. The rod end member 92 includes a shaft portion 92b having a thread portion 92a (external thread) formed in the outer circumference and a polygonal tool insertion hole 92c formed in an end of the shaft portion 92b.

Figure 12:
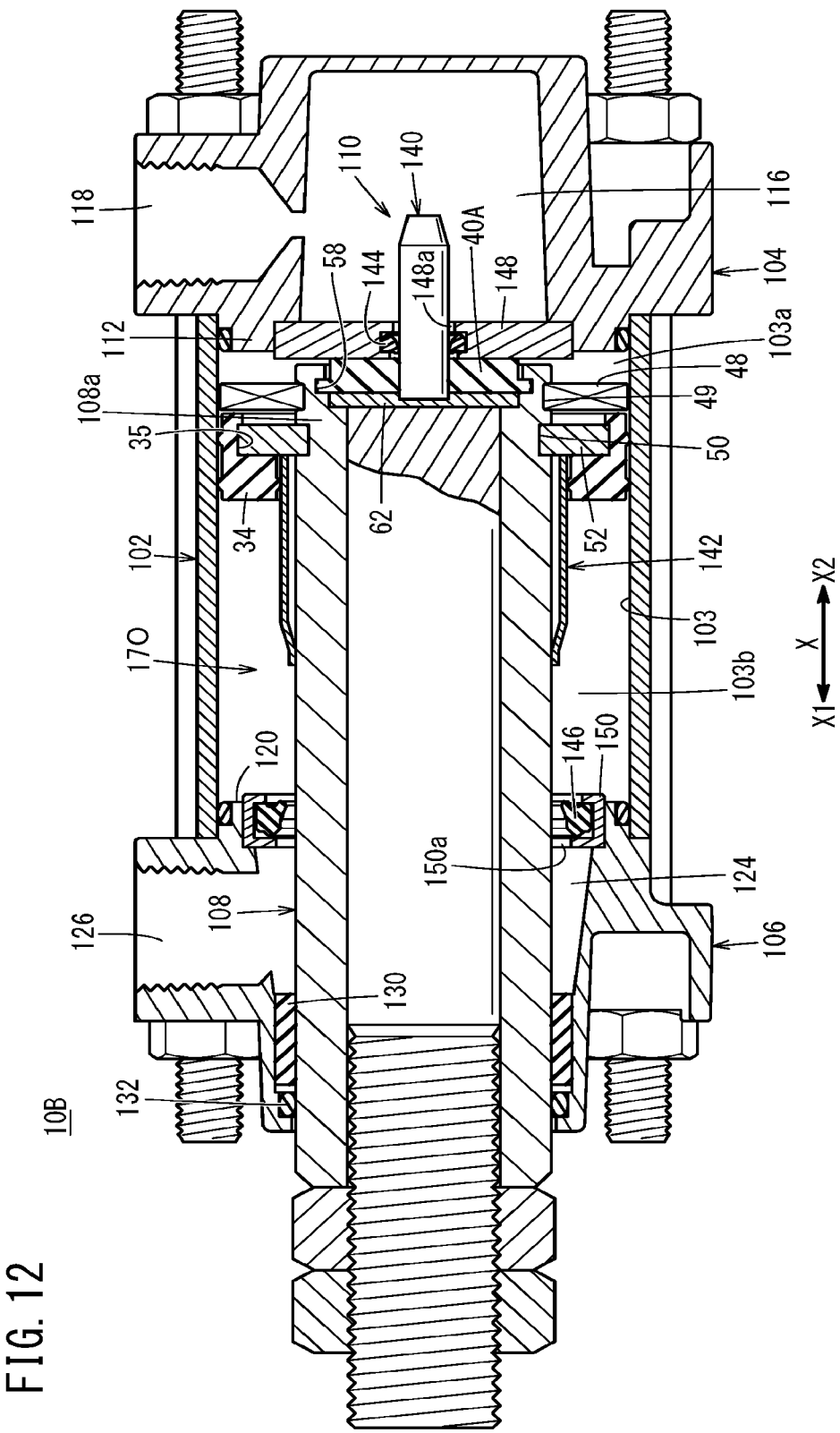
FIG. 12 is a cross-sectional view of a fluid pressure cylinder provided with a rod assembly according to a fifteenth embodiment.

A fluid pressure cylinder 10B shown in FIG. 12 comprises a cylinder tube 102 (body) having a hollow tubular shape, a head cover 104 disposed at one end portion of the cylinder tube 102, and a rod cover 106 disposed at another end portion of the cylinder tube 102. The fluid pressure cylinder 10B further comprises a rod assembly 17O disposed to be able to reciprocate with respect to the cylinder tube 102 and a cushioning mechanism 110 relieving impact at both stroke ends. The rod assembly 17O comprises a rod member 108 and the packing 34 attached to the rod member 108.

The cylinder tube 102 has a cylindrical body, and contains therein a slide hole 103 (cylinder chamber) closed by the head cover 104 and the rod cover 106.

A first stepped portion 112 of the head cover 104 is inserted into the one end portion of the cylinder tube 102 located in the direction of the arrow X2. A first central hollow portion 116 and a first port 118 communicating with the first central hollow portion 116 are formed in the head cover 104. Pressurized fluid is supplied and discharged via the first port 118.

A second stepped portion 120 of the rod cover 106 is inserted into the other end portion of the cylinder tube 102 located in the direction of the arrow X1. A second central hollow portion 124 and a second port 126 communicating with the second central hollow portion 124 are formed in the rod cover 106. Pressurized fluid is supplied and discharged via the second port 126. A ring-shaped bush 130 and a ring-shaped packing 132 are disposed on an inner circumferential part of the rod cover 106.

The packing 34 is attached to an outer circumferential part of one end portion (hereinafter referred to as "base end portion 108a") of the rod member 108. The packing 34 is disposed at an end portion of a second cushioning member 142 (described below) adjacent to the head cover 104. The outer circumferential surface of the packing 34 is in contact with the inner circumferential surface defining the slide hole 103 over the entire circumference. The inner circumferential surface of the packing 34 is in contact with the outer circumferential surface of the second cushioning member 142 over the entire circumference. The rod member 108 includes the stopper receiving groove 50 and the magnet receiving groove 49 formed in an outer circumferential part. The stopper member 52 is installed in the stopper receiving groove 50. The magnet 48 is installed in the magnet receiving groove 49.

A damper member 40A is attached to the base end portion 108a of the rod member 108. The damper member 40A is obtained by modifying the damper member 40 (FIG. 1) so as to be hollow.

The cushioning mechanism 110 includes the first cushioning member 140 and a second cushioning member 142

(cushion ring), which are provided on the movable part (rod member 108), and a ring-shaped first cushion seal 144 and a ring-shaped second cushion seal 146, which are composed of elastic members and provided on the fixed part (the head cover 104 and the rod cover 106).

The first cushioning member 140 is disposed at an end of the rod member 108 located in the direction of the arrow X2 so as to be coaxial with the rod member 108. Specifically, the first cushioning member 140 has a smaller diameter than the rod member 108 and protrudes from the supporting member 62 and the damper member 40A in the direction of the arrow X2. The first cushioning member 140 has a hollow or solid cylindrical shape. The outer diameter of the first cushioning member 140 is smaller than the outer diameter of the damper member 40A.

The first cushioning member 140 may be a part integrated with the rod member 108 or may be a separate part joined to the rod member 108. In the case where the first cushioning member 140 is a part separate from the rod member 108, the first cushioning member 140 may be joined to the rod member 108 by joining means such as welding, bonding, and screwing.

The first cushion seal 144 is held by the inner circumference of a ring-shaped first holder 148. The first holder 148 is secured to the inner circumference of the first stepped portion 112 of the head cover 104. While the first cushioning member 140 is not inserted into a hole 148a of the first holder 148, the slide hole 103 and the first central hollow portion 116 communicate with each other via the hole 148a. When the first cushioning member 140 is inserted into the hole 148a of the first holder 148, the first cushion seal 144 is brought into sliding contact with the outer circumferential surface of the first cushioning member 140 over the entire circumference.

The second cushioning member 142 is disposed adjacent to the packing 34 and coaxially with the rod member 108. The second cushioning member 142 is a ring-shaped member having a larger diameter than the rod member 108 and a smaller diameter than the packing 34, and is joined to the outer circumferential surface of the rod member 108 by, for example, welding, bonding, or the like. In FIG. 12, the outer diameter of the second cushioning member 142 is slightly larger than the outer diameter of the rod member 108.

The second cushion seal 146 is held by the inner circumference of a ring-shaped second holder 150. The second holder 150 is secured to the inner circumference of the second stepped portion 120 of the rod cover 106. While the second cushioning member 142 is not inserted into a hole 150a of the second holder 150, the slide hole 103 and the second central hollow portion 124 communicate with each other via the hole 150a. When the second cushioning member 142 is inserted into the hole 150a of the second holder 150, the second cushion seal 146 is brought into sliding contact with the outer circumferential surface of the second cushioning member 142 over the entire circumference.

Next, the effects of the fluid pressure cylinder 10B configured as above will be described. In the description below, air (compressed air) is used as pressurized fluid. However, gas other than air may be used.

In the fluid pressure cylinder 10B, the rod assembly 17O is moved back and forth along the slide hole 103 in the axial direction by the effect of pressurized fluid introduced via the first port 118 or the second port 126.

Specifically, while the rod assembly 17O is located at a retracted position shown in FIG. 12, the second port 126 is exposed to the atmosphere, and air is supplied from a pressurized fluid supply source (not illustrated) to a first pressure chamber 103a via the first port 118, the first central hollow portion 116, and the hole 148a. This causes the rod assembly 17O to be displaced (advanced) toward the rod cover 106. In this case, the air inside a second pressure chamber 103b is discharged from the second port 126 via the hole 150a of the second holder 150 and the second central hollow portion 124.

When the packing 34 comes into abutment against the second holder 150, the advancing motion of the rod assembly 17O stops.

When the rod assembly 17O approaches an advanced position, the second cushioning member 142 is inserted into the hole 150a of the second holder 150. This causes the inner circumference of the second cushion seal 146 to come into contact with the outer circumferential surface of the second cushioning member 142 and thus creates an airtight seal at the contact area.

As a result, an air cushion is formed in the second pressure chamber 103b. The air cushion in the second pressure chamber 103b serves as displacement resistance of the rod assembly 17O and decelerates the displacement of the rod assembly 17O in the vicinity of the stroke end on the rod cover 106 side. Consequently, impact occurring when the rod assembly 17O reaches the stroke end is further relieved. The air is discharged to the second port 126 via a small hole (not illustrated) by a small amount.

On the other hand, while the rod assembly 17O is located at the advanced position (stroke end on the rod cover 106 side), the first port 118 is exposed to the atmosphere, and air is supplied from the pressurized fluid supply source (not illustrated) to the second pressure chamber 103b via the second port 126, the second central hollow portion 124, and the hole 150a. This causes the rod assembly 17O to be displaced (retracted) toward the head cover 104. In this case, the air inside the first pressure chamber 103a is discharged from the first port 118 via the hole 148a of the first holder 148 and the first central hollow portion 116. When the damper member 40A comes into abutment against the first holder 148, the retracting motion of the rod assembly 17O stops.

When the rod assembly 17O approaches the retracted position, the first cushioning member 140 is inserted into the hole 148a of the first holder 148. This causes the inner circumference of the first cushion seal 144 to come into contact with the outer circumferential surface of the first cushioning member 140 and thus creates an airtight seal at the contact area.

As a result, an air cushion is formed in the first pressure chamber 103a. The air cushion in the first pressure chamber 103a serves as displacement resistance during the displacement of the rod assembly 17O toward the head cover 104 and decelerates the displacement of the rod assembly 17O in the vicinity of the stroke end on the head cover 104 side. Consequently, impact occurring when the rod assembly 17O reaches the stroke end is further relieved.

Figure 13A:
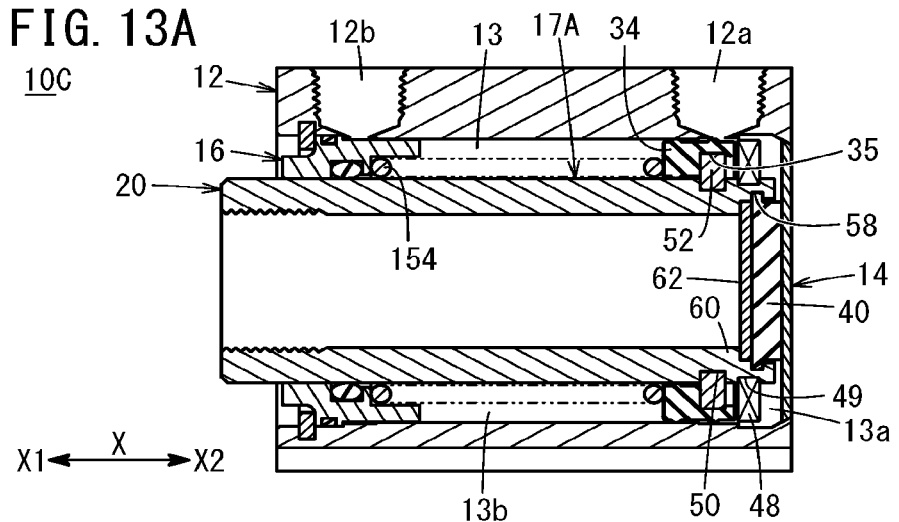
FIG. 13A is a cross-sectional view of a fluid pressure cylinder configured as a single-acting cylinder.

A fluid pressure cylinder 10C shown in FIG. 13A is configured as a so-called single-acting cylinder. More specifically, the fluid pressure cylinder 10C is obtained by disposing a spring 154 between the packing 34 and the rod cover 16 in the fluid pressure cylinder 10A (FIG. 1). In this case, the second port 12b is exposed to the atmosphere.

In the fluid pressure cylinder 10C, when pressurized fluid is supplied to the first pressure chamber 13a via the first port 12a, the rod assembly 17A is displaced (advanced) toward the rod cover 16 by the pressurized fluid and reaches the stroke end at the advanced position. When the supply of the pressurized fluid to the first port 12a is stopped and the first port 12a is exposed to the atmosphere, the rod assembly 17A is displaced (retracted) toward the head cover 14 by the elastic biasing force of the spring 154 and reaches the stroke end at the retracted position.

Figure 13B:
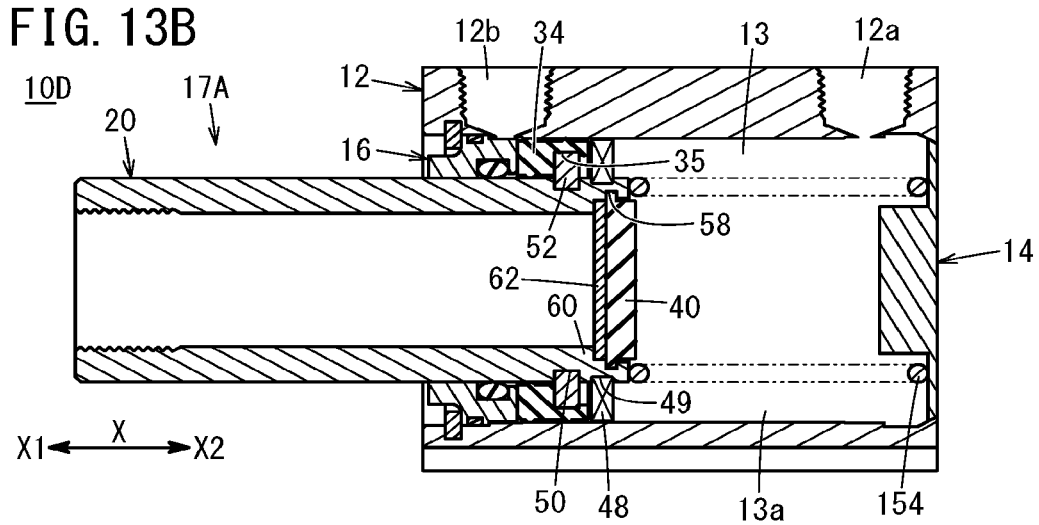
FIG. 13B is a cross-sectional view of another fluid pressure cylinder configured as a single-acting cylinder.

A fluid pressure cylinder 10D shown in FIG. 13B is also configured as a so-called single-acting cylinder. More specifically, the fluid pressure cylinder 10D is obtained by disposing a spring 154 between the packing 34 and the head cover 14 in the fluid pressure cylinder 10A (FIG. 1). In this case, the first port 12a is exposed to the atmosphere.

In the fluid pressure cylinder 10D, when pressurized fluid is supplied to the second pressure chamber 13b via the second port 12b, the rod assembly 17A is displaced (retracted) toward the head cover 14 by the pressurized fluid and reaches the stroke end at the retracted position. When the supply of the pressurized fluid to the second port 12b is stopped and the second port 12b is exposed to the atmosphere, the rod assembly 17A is displaced (advanced) toward the rod cover 16 by the elastic biasing force of the spring 154 and reaches the stroke end at the advanced position.

Figure 13C:
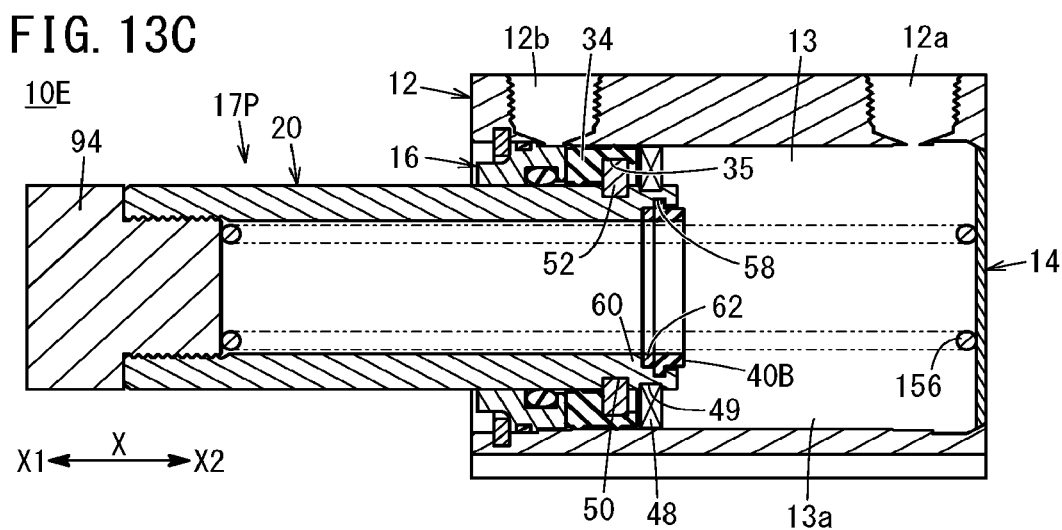
FIG. 13C is a cross-sectional view of another fluid pressure cylinder configured as a single-acting cylinder provided with a rod assembly according to a sixteenth embodiment.

A fluid pressure cylinder 10E shown in FIG. 13C is also configured as a so-called single-acting cylinder. The fluid pressure cylinder 10E has a rod assembly 17P. In the rod assembly 17P, a damper member 40B attached to the base end portion of the rod member 20 has a circular ring shape.

A rod end member 94 is attached to the distal end portion of the rod member 20. The rod end member 94 may be configured similarly to the rod end member 90 (FIG. 11B) or the rod end member 92 (FIG. 11C) described above. A spring 156 is inserted in the hollow portion of the rod member 20. The spring 156 is disposed between the rod end member 94 and the head cover 14. The fluid pressure cylinder 10E configured as above operates similarly to the fluid pressure cylinder 10D described above.

Figure 14A:
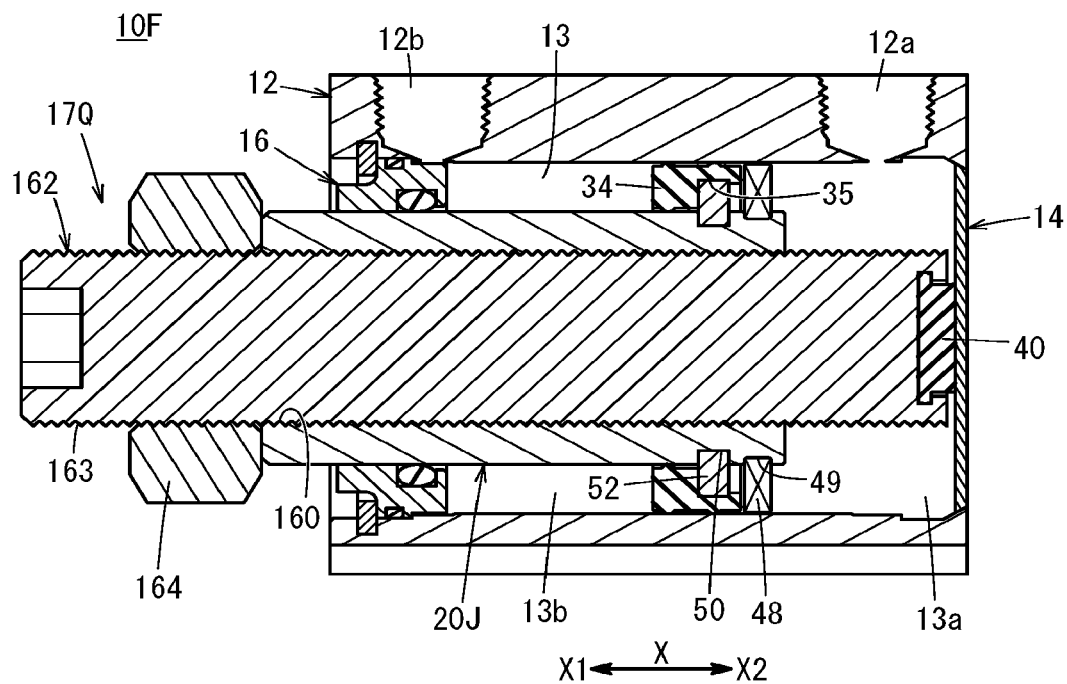
FIG. 14A is a cross-sectional view of a fluid pressure cylinder provided with a rod assembly according to a seventeenth embodiment.

A rod assembly 17Q of a fluid pressure cylinder 10F illustrated in FIG. 14A comprises a hollow rod member 20J having an internal thread portion 160 formed in the inner circumferential surface, the packing 34 attached to an outer circumferential part of the rod member 20J, and an adjustment bolt 162 inserted into the rod member 20J and screw-engaged with the rod member 20J. The adjustment bolt 162 has, formed on an outer circumference thereof, an external thread portion 163 configured to be screw-engaged with the internal thread portion 160. The adjustment bolt 162 protrudes from the rod member 20J toward the distal end (in the direction of the arrow X1). An adjustment nut 164 is screw-engaged onto the adjustment bolt 162 at a position closer to the distal end than the rod member 20J. The damper member 40 is attached to the base end portion of the rod member 20J.

According to the rod assembly 17Q configured as above, the retraction amount by which the rod member 20J is pulled or retracted into the cylinder tube 12 can be adjusted by adjusting the protrusion length by which the adjustment bolt 162 protrudes from the rod member 20J toward the head cover 14.

Figure 14B:
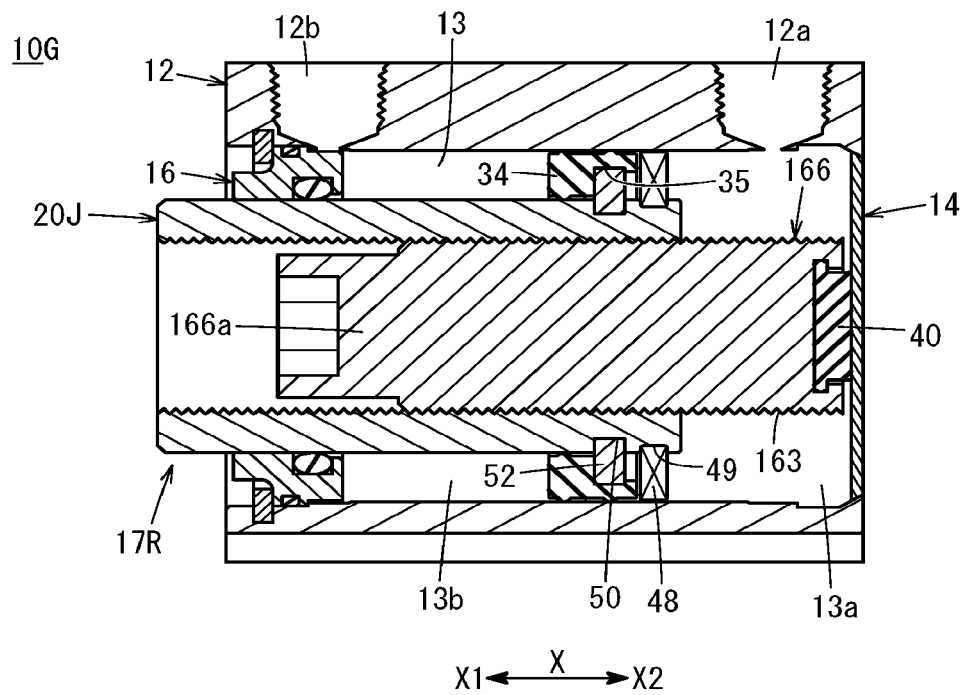
FIG. 14B is a cross-sectional view of a fluid pressure cylinder provided with a rod assembly according to an eighteenth embodiment.

A rod assembly 17R of a fluid pressure cylinder 10G illustrated in FIG. 14B adopts an adjustment bolt 166 shorter than the above-described adjustment bolt 162 (FIG. 14A). In a state where the adjustment bolt 166 protrudes outside from the rod member 20J toward the head cover 14, a distal end portion 166a of the adjustment bolt 166 is located inside the hollow portion of the rod member 20J. The distal end portion 166a of the adjustment bolt 166 is not provided with the external thread portion 163, and the outer diameter of the distal end portion 166a is smaller than the outer diameter of a portion provided with the external thread portion 163.

The present invention is not limited to the above-described embodiments, and various modifications can be made without departing from the scope of the present invention. For example, the present invention is applicable to fluid pressure cylinders provided with piston units and cylinder tubes having non-circular (quadrangular or elongated circular such as elliptical) cross-sections (for example, the rod assembly 17B in FIG. 3). Moreover, the present invention is also applicable to multi-rod (such as dual rod) fluid pressure cylinders provided with a plurality of pistons and piston rods.

Yet moreover, the present invention is not limited to the fluid pressure cylinders used as actuators or the like, and is also applicable to different configurations of fluid pressure devices including pistons. The different configurations of fluid pressure devices equipped with pistons, to which the present invention is applicable, include, for example, a valve device for switching channels by moving a valve element using a piston, a length-measurement cylinder for measuring length by displacing a piston connected to a piston rod serving as an input shaft, a sliding table connected to a piston via a piston rod and configured to be displaced by displacing the piston via the piston rod, and a chuck device for gripping a workpiece using a gripping part that opens and closes by displacing a piston and then converting the displacement of the piston.

The invention claimed is:

1. A rod assembly configured to reciprocate along a slide hole of a fluid pressure device, comprising:
   a rod member; and
   a packing attached to an outer circumferential part of the rod member and configured to slide along the slide hole, wherein:
   the rod member includes, in the outer circumferential part, a stopper receiving groove extending in a circumferential direction;
   a stopper member divided into a plurality of elements in the circumferential direction is installed into the stopper receiving groove,
   wherein the packing includes:
   a packing body portion covering one end in an axial direction of the stopper member and coming into abutment against the outer circumferential part of the rod member,
   a circumference covering portion protruding from the packing body portion in the axial direction to cover an outer circumference of the stopper member, and
   an annular engaging groove formed in an inner circumferential part of the circumference covering portion to elastically engage with the stopper member,
   and wherein
   the packing has an L-shaped cross-section and includes an opening from which an other end in the axial direction of the stopper member is exposed, the packing being integrally formed of an elastic material, and
   the packing covers the stopper member, and thus the stopper member supports the packing and is prevented from coming off the stopper receiving groove.

2. The rod assembly according to claim 1, wherein the packing also functions as a damper configured, to relieve impact occurring when the rod member reaches a stroke end.

3. The rod assembly according to claim 1, wherein the rod member has a hollow shape.

4. The rod assembly according to claim 1, wherein:
   the rod member has a hollow shape;

a damper member configured to relieve impact occurring when the rod member reaches a stroke end is attached to an end portion of the rod member; and the damper member airtightly or liquid-tightly blocks up a hollow portion of the rod member.

5. The rod assembly according to claim 4, wherein an outer circumferential part of the damper member is attached to an inner circumferential part of the rod member.

6. The rod assembly according to claim 4, wherein a supporting member configured to be harder than the damper member and to support the damper member is disposed in the hollow portion of the rod member.

7. The rod assembly according to claim 1, wherein:
the rod member includes a magnet receiving groove in an outer circumferential part thereof; and
a magnet having an annular shape is installed in the magnet receiving groove.

8. The rod assembly according to claim 1, wherein:
the packing is provided with at least one magnet receiving groove, having a depth in an axial direction; and
a magnet is installed in the at least one magnet receiving groove.

9. The rod assembly according to claim 8, wherein:
an outer circumference of the packing has a non-circular shape;
the at least one magnet receiving groove comprises a plurality of magnet receiving grooves disposed at intervals in a circumferential direction; and
the magnet is installed in only part of the plurality of magnet receiving grooves.

10. A fluid pressure device, comprising:
a body containing therein a slide hole; and
a rod assembly disposed so as to reciprocate along the slide hole, wherein:
the rod assembly includes a rod member and a packing attached to an outer circumferential part of the rod member and configured to slide along the slide hole;
the rod member includes, in the outer circumferential part, a stopper receiving groove extending in a circumferential direction;
a stopper member divided into a plurality of elements in the circumferential direction is installed into the stopper receiving groove,
wherein the packing includes:
a packing body portion covering one end in an axial direction of the stopper member and coining into abutment against the outer circumferential part of the rod member,
a circumference covering portion protruding from the packing body portion in the axial direction to cover an outer circumference of the stopper member, and
an annular engaging groove formed in an inner circumferential part of the circumference covering portion to elastically engage with the stopper member,
and wherein
the packing has an L-shaped cross-section and includes an opening from which an other end in the axial direction of the stopper member is exposed, the packing being integrally formed of an elastic material, and
the packing covers the stopper member, and thus the stopper member supports the packing and is prevented from coming off the stopper receiving groove.

11. The fluid pressure device according to claim 10, wherein the fluid pressure device is configured as a fluid pressure cylinder, a valve device, a length-measurement cylinder, a sliding table, or a chuck device.

* * * * *